United States Patent

Skarzynski

[15] 3,704,002
[45] Nov. 28, 1972

[54] DISCONNECTABLE COUPLINGS
[72] Inventor: Maciej Stanislaw Skarzynski, 296 Kingston Road, Wimbledon Chase, London, England
[22] Filed: Aug. 11, 1971
[21] Appl. No.: 170,918

[30] Foreign Application Priority Data
Aug. 14, 1970 Great Britain..........39,267/70

[52] U.S. Cl. ........251/149.6, 251/149.9, 137/614.06
[51] Int. Cl. ..........................F16k 29/00, F16l 37/28
[58] Field of Search .137/614.05, 614.06; 251/149.6, 251/149.8, 149.1

[56] References Cited

UNITED STATES PATENTS

| R27,364 | 5/1972 | German.................251/149.6 |
| 3,236,251 | 2/1966 | Hansen................137/614.05 |
| 3,112,766 | 12/1963 | Zeliznak et al. .......137/614.05 |
| 2,905,485 | 9/1959 | Zajac....................251/149.6 |
| 2,377,812 | 1/1943 | Scheiwer...............251/149.6 |
| 2,279,146 | 4/1942 | Schneller..............251/149.6 |

FOREIGN PATENTS OR APPLICATIONS 38,776 9/1971 Great Britain..........251/149.6

*Primary Examiner*—Samuel Scott
*Assistant Examiner*—Ira S. Lazarus
*Attorney*—Christen, Sabol & O'Brien

[57] ABSTRACT

A readily connectable and disconnectable coupling comprising a first member adapted to be connected to a source of fluid under pressure and a second member adapted to be connected to a fluid consuming or control unit, one of the members having a flow control valve urged towards a seat in the fluid flow passageway by resilient means whilst the other coupling member is provided with a valve actuating member and fluid sealing means, the members being coupled together by abutment members associated with one member each engaging a groove formation in th other member, groove formations being such that initial axial movement followed by a partial rotative movement between the two members causes the sealing means to effect a fluid-tight seal with said passageway and further axial movement followed by a partial rotative movement causes the valve actuating member to engage and open said valve.

6 Claims, 4 Drawing Figures

INVENTOR
MACIEJ STANISLAW SKARZYNSKI

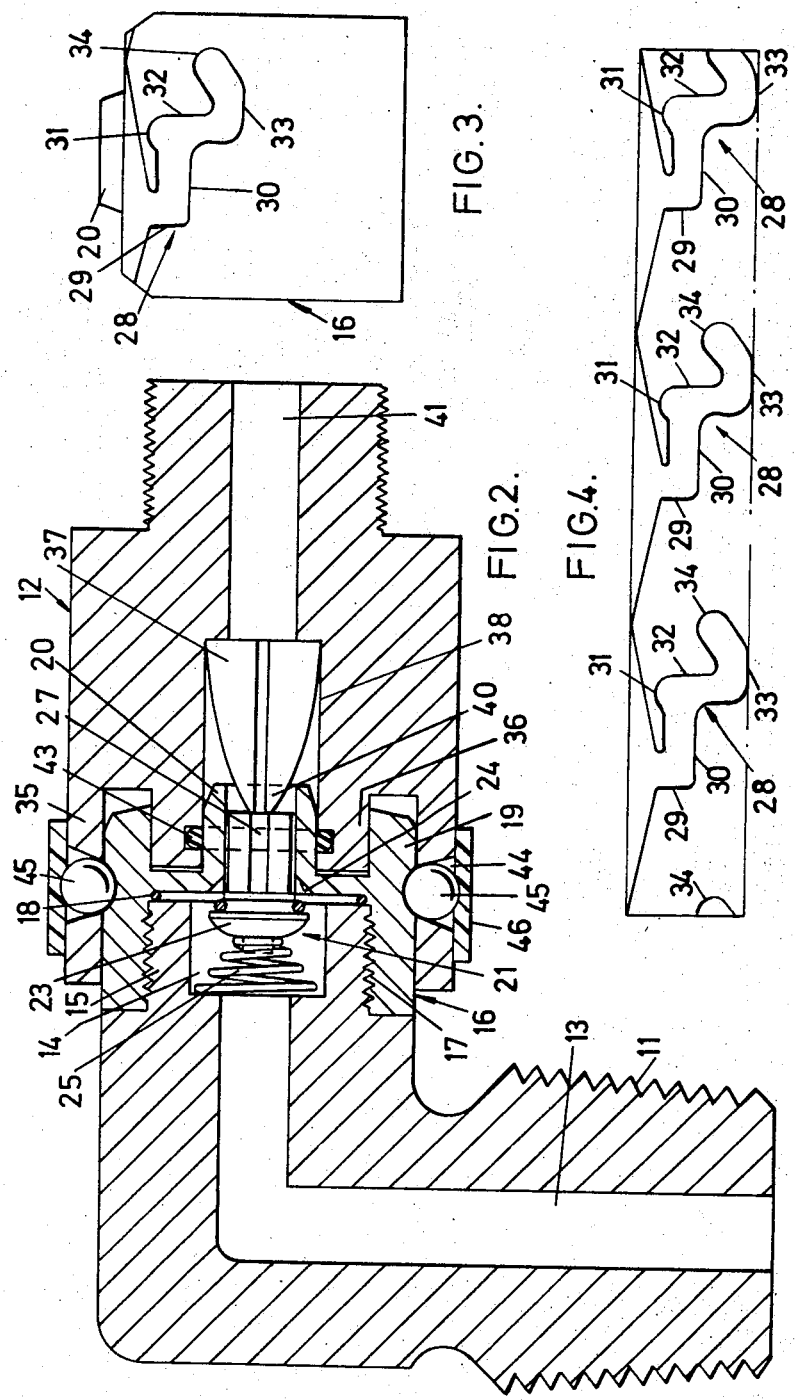

DISCONNECTABLE COUPLINGS

The present invention relates to readily connectible and disconnectable couplings for the flow control of pressurized fluids and is directed more particularly to the type of coupling in which a flow control valve is operated automatically by the connection or disconnection of the members forming the coupling.

Although the present invention is susceptible of use in numerous environments it has particular utility in applications where it is desired to connect a source of pressurized gas (e.g. butane or propane) to a burner unit or in hospitals having oxygen or other gases piped to outlets positioned adjacent the patients beds and it is necessary to connect the outlet to an appliance in order to administer oxygen to a patient.

An object of the present invention is to provide a simplified construction of coupling in which the flow of pressurized fluid can be terminated merely by partially rotating one member of the coupling relative to the other member without actually disconnecting the members.

A further object is to provide a coupling, the component parts of which can be readily adapted for use in existing valves.

The present invention consists in a readily connectible and disconnectible coupling comprising a first member adapted to be connected to a source of fluid under pressure and a second member adapted to be connected to a fluid consuming or control unit, one of the members having a flow control valve urged towards a seat in the fluid flow passageway by resilient means whilst the other coupling member is provided with a valve actuating member and fluid sealing means, the members being coupled together by abutment members associated with one member each engaging a groove formation in the other member, the groove formations being such that initial axial movement followed by a partial rotative movement between the two members causes the sealing means to effect a fluid-tight seal with said passageway and further axial movement followed by a partial rotative movement causes the valve actuating member to engage and open said valve.

In the accompanying drawings:

FIG. 2 is a sectional view similar to FIG. 1, but showing the coupling in an assembled condition.

FIG. 3 is a side view of one of the members forming the coupling and

FIG. 4 is a developed view of the groove formations on the member shown in FIG. 3.

Figure 1:
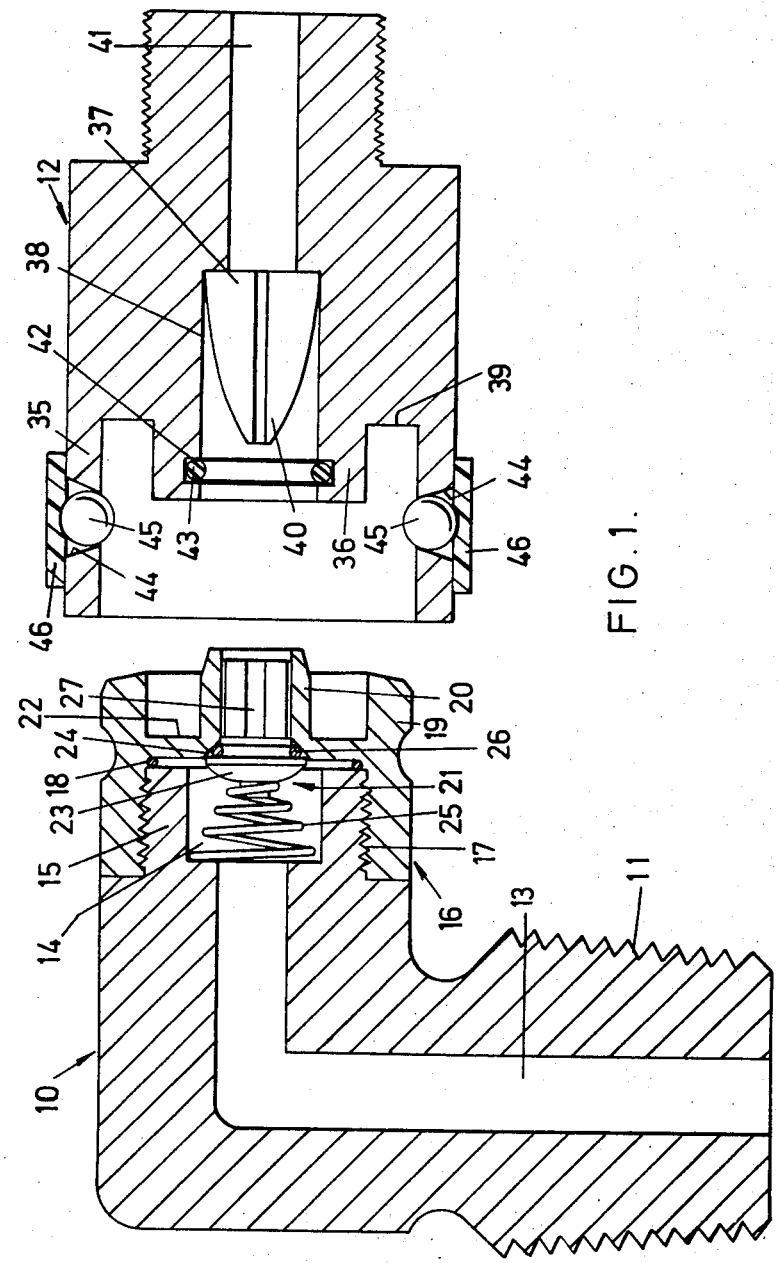
FIG. 1 is a sectional view of the coupling in a dissembled condition.

In carrying the invention into effect according to one convenient mode, by way of example, the coupling arrangement comprises a valved member 10 having a taper threaded portion 11 adapted to be connected to a gas cylinder (not shown) and a valve actuator member or connector 12 adapted to be connected by a pipe (not shown) to a burner unit.

The member 10 is elbow-shaped and provided with a bore 13 which leads to a valve chamber 14 formed in an externally threaded boss 15. An adaptor 16 has internal threads 17 by which it is mounted on the external threads of the boss 15 and an O-ring 18 forms a gastight seal between the two members.

The adaptor 16 is provided with a peripheral flange 19 and a co-axially disposed boss 20 accommodating a valve 21, the flange and boss forming an annular recess 22 therebetween. The valve has a head portion 23 which is urged towards a seat 24, positioned at the inner end of the boss 20, by a spring 25 and an O-ring 26 surrounding the head portion 13 engages the seat 24 when the valve is in a closed position. The valve stem 27 is fluted to permit passage of the gas when the valve is open and is a sliding fit in the boss 20.

The exterior surface of the adaptor 16 is provided with three groove formations 28 spaced 120° from one another (see FIG. 4). Each groove formation comprises a continuous groove having a short axially extending portion 29 which joins a transverse portion 30 at the end of which is a terminal or dwell portion 31 and a further axially extending portion 32 which joins a further transverse portion 33 at the end of which is a further terminal or dwell portion 34. The purpose and functioning of these groove formations will be described in detail hereinafter.

The connector 12 is provided with a peripheral flange 35 and a co-axially disposed boss 36 which accommodates a valve actuating member 37 in a cylindrical chamber 38 with a press fit, the flange and boss forming an annular recess 39 therebetween which, in use, receives the peripheral flange 19 of the adaptor 16. The valve actuating member 37 is fluted to permit the passage of gas when the valve is open and tapers to form a nose portion 40 which, in use, engages the stem 27 of the valve 21. The chamber 38 communicates with a bore 41 leading to the burner unit (not shown). The interior surface of the chamber 38 is provided with a groove 42 accommodating an O-ring 43 which, in use, engages the external surface of the adaptor boss 20 to form a gas-tight seal.

The peripheral flange 35 is provided with three apertures 44 of tapered cross-section which are spaced 120° apart and accommodate a ball 45. It is to be noted that in FIGS. 1 and 2, the groove formations 28 and balls 45 have, for convenience, been shown spaced 180° apart. A sleeve 46 of resilient plastics material retain the balls in position in the apertures 44 with a part-spherical portion of each ball protruding inwardly beyond the interior surface of the peripheral flange 35. The tapered cross-section of the apertures prevents the balls from passing therethrough.

In use, connection of the members is effected as follows: First the balls 45 are aligned with their respective groove formations 28 and axial movement of the connector 12 towards the member 10 causes each ball to traverse the axially extending portion 29 of the groove. When the balls reach the end of the axial portions 29, connector 12 is given a partial rotative movement which causes each ball to traverse the transversely extending portion 30 of the groove until it reaches the terminal portion 31. In this position, the 0-ring 43 sealingly engages the boss 20, but the valve 21 remains in its closed position.

To effect opening of the valve 21, the connector 12 is given a further axial movement which causes each ball 45 to traverse the axial extending portion 32 of the groove and with this movement the nose portion 40 of the valve actuating member 37 engages the end of the valve 21 and opens same against the action of the spring 25. When the balls 45 reach the ends of the axial portions 32, the connector is given a further partial rotative movement in the same direction as the initial rotative movement which causes each ball to traverse the transversely extending portion 33 of the groove until it reaches the end of the groove, whereupon the spring 25 reasserts itself so that the balls 45 are each releasably urged into their associated terminal portion 34. In this position, the valve is held in the open position to permit the flow of gas therethrough.

Thus it will be seen that with this arrangement it is possible to terminate the gas flow without separating the members by merely moving the connector 12 axially against the spring 25 to release the balls 45 from their respective terminal portions 34, rotating the connector 12 in the opposite direction and then allowing the spring 25 to urge the connector 12 axially outwards until the balls 45 are located in their respective terminal portions 31.

I claim:

1. A readily connectable and disconnectable coupling comprising a first member adapted to be connected to a source of fluid under pressure and a second member adapted to be connected to a fluid consuming or control unit, a flow control valve in one of the members urged towards a seat in a fluid flow passageway by resilient means, a valve actuating member and fluid sealing means in the other coupling member, the members being coupled together by abutment members associated with one member each engaging a groove formation in the other member, the groove formations being such that initial axial movement followed by a partial rotative movement between the two members causes the sealing means to effect a fluidtight seal with said passageway and further axial movement followed by a partial rotative movement causes the valve actuating member to engage and open said valve.

2. A coupling as claimed in claim 1, wherein said one member is provided with a peripheral flange and a co-axially disposed boss which slidably receives said valve and forms said passageway, the flange and boss forming an annular recess therebetween with said valve seat positioned at one end of said boss.

3. A coupling as claimed in claim 2, wherein said groove formations are equally spaced around the exterior surface of said peripheral flange.

4. A coupling as claimed in claim 3, wherein said other coupling member is provided with a peripheral flange and a co-axially disposed boss housing said valve actuating member, the flange and boss forming an annular recess therebetween which, in use, receives the peripheral flange of said one member.

5. A coupling as claimed in claim 4, wherein said fluid sealing means comprises an O-ring accommodated in the boss of said other coupling member which, in use, sealingly engages the boss of said other one member.

6. A coupling as claimed in claim 5, wherein said abutment members each comprises a ball accommodated in an aperture of tapered cross-section formed in the peripheral flange of said other coupling member, the balls being retained in the apertures by a surrounding resilient sleeve.

* * * * *